United States Patent
Zou et al.

(10) Patent No.: US 11,318,613 B2
(45) Date of Patent: May 3, 2022

(54) METHOD AND SYSTEM FOR DETERMINING MOTION PATH OF MECHANICAL ARM

(71) Applicant: XIANGTAN UNIVERSITY, Xiangtan (CN)

(72) Inventors: Juan Zou, Xiangtan (CN); Chan Fan, Xiangtan (CN); Xinghong Wu, Xiangtan (CN); Bin Deng, Xiangtan (CN); Qiuzhen Wang, Xiangtan (CN); Jinhua Zheng, Xiangtan (CN)

(73) Assignee: Xiangtan University, Xiangtan (CN)

( * ) Notice: Subject to any disclaimer, the term of this patent is extended or adjusted under 35 U.S.C. 154(b) by 314 days.

(21) Appl. No.: 16/562,618

(22) Filed: Sep. 6, 2019

(65) Prior Publication Data

US 2020/0101608 A1     Apr. 2, 2020

(30) Foreign Application Priority Data

Sep. 30, 2018 (CN) .......................... 201811154733.5

(51) Int. Cl.
*B25J 9/16* (2006.01)
*G06N 3/12* (2006.01)

(52) U.S. Cl.
CPC ............ *B25J 9/1664* (2013.01); *G06N 3/126* (2013.01)

(58) Field of Classification Search
CPC .......... B25J 9/1664; B25J 9/163; G06N 3/126
USPC ................................................. 700/245–264
See application file for complete search history.

(56) References Cited

U.S. PATENT DOCUMENTS

| | | | | | |
|---|---|---|---|---|---|
| 4,547,858 | A | * | 10/1985 | Horak ..................... | G05B 19/19 318/568.11 |
| 4,975,856 | A | * | 12/1990 | Vold ....................... | B25J 9/1602 700/251 |
| 5,550,953 | A | * | 8/1996 | Seraji ....................... | B25J 9/162 700/262 |
| 5,590,034 | A | * | 12/1996 | Snell ....................... | B25J 9/1643 700/263 |
| 5,737,500 | A | * | 4/1998 | Seraji ....................... | B25J 9/1643 700/262 |

(Continued)

*Primary Examiner* — Jaime Figueroa
(74) *Attorney, Agent, or Firm* — Troutman Pepper Hamilton Sanders LLP; Christopher C. Close, Jr.

(57) ABSTRACT

Disclosed is a method and system for determining a motion path of a mechanical arm in which, after a kinematics model of a mechanical arm is established, multiple objective optimization functions are constructed according to the model, theoretical coordinates of a tail end of the arm, and an arm length. If a number of individuals in an evolutionary population, that makes both lateral and longitudinal error optimization functions in an optimization function monotonically increase or decrease, reaches the threshold, an optimal solution is determined using a single-objective evolutionary algorithm; otherwise, a multi-objective evolutionary algorithm is used. The multi- or single-objective evolutionary algorithms can be adaptively selected according to the number of individuals in the population that makes the lateral and longitudinal error optimization functions change. Therefore, short time consumption of single-objective and high accuracy of multi-objective are combined to quickly and accurately plan a motion path of the mechanical arm.

9 Claims, 3 Drawing Sheets

(56) References Cited

U.S. PATENT DOCUMENTS

| | | | | |
|---|---|---|---|---|
| 5,880,956 A | * | 3/1999 | Graf | G05B 19/423 |
| | | | | 700/86 |
| 6,023,645 A | * | 2/2000 | Harima | G05G 15/00 |
| | | | | 700/250 |
| 6,489,741 B1 | * | 12/2002 | Genov | B25J 9/163 |
| | | | | 318/561 |
| 10,757,861 B2 | * | 9/2020 | Robertson | G06T 7/50 |
| 2012/0123590 A1 | * | 5/2012 | Halsmer | B25J 9/1656 |
| | | | | 901/3 |
| 2019/0261565 A1 | * | 8/2019 | Robertson | A01D 46/243 |

* cited by examiner

METHOD AND SYSTEM FOR DETERMINING MOTION PATH OF MECHANICAL ARM

This application claims priority to Chinese application number 201811154733.5, filed Sep. 30, 2018 with a title of METHOD AND SYSTEM FOR DETERMINING MOTION PATH OF MECHANICAL ARM. The above-mentioned patent application is incorporated herein by reference in its entirety.

TECHNICAL FIELD

The present invention relates to the robot control field, and in particular, to a system for determining a motion path of a mechanical arm.

BACKGROUND

With the rapid development of industry, mechanical arms are applied in various fields. A mechanical arm is an automation device that can autonomously move in an intelligent production process. The development of artificial intelligence allows production of automation devices become a hot development technology, further broadening an application field of mechanical arms and implementing good combination of automation and mechanization.

Path planning of a mechanical arm can be converted into solving of an optimum solution of a multi-objective function after a model is established. In a process of obtaining an optimal solution of an objective function, an existing multi-objective evolutionary algorithm has relatively high accuracy, but takes a relatively long time, causing a waste of resources to some extent. However, a single-objective evolutionary algorithm has strong local convergence and simple operation steps, takes a short time, but causes a relatively large error.

SUMMARY

An object of the present invention is to provide a method and system for determining a motion path of a mechanical arm, so as to quickly and accurately plan a motion path of a mechanical arm.

To achieve the above purpose, the present invention provides the following technical solutions.

A method for determining a motion path of a mechanical arm includes:

obtaining theoretical coordinates of a tail end of a mechanical arm, an arm length of the mechanical arm, and a base joint rotation angle of the mechanical arm;

establishing a kinematics model of the mechanical arm according to the base joint rotation angle;

constructing an optimization function according to the kinematic model, the theoretical coordinates of the tail end, and the arm length, where the optimization function includes a lateral error optimization function with an optimization objective of minimizing a length error of a transverse projection of the mechanical arm and a longitudinal error optimization function with an optimization objective of minimizing a length error of a vertical projection of the mechanical arm;

obtaining the $t^{th}$ generation evolutionary population $P_t$, where the population includes multiple individuals, each individual is a group of arm joint rotation angles of the mechanical arm, and $0 < t \leq T$, where T represents an evolution algebra threshold;

determining whether a number, of individuals in the population, that makes the optimization function monotonically increase or decrease is greater than or equal to a preset monotonicity threshold, to obtain a first determining result;

when the first determining result indicates that the number, of individuals in the population, that makes the optimization function monotonically increase or decrease is greater than or equal to the preset monotonicity threshold, determining an optimal solution of the optimization function by using a single-objective evolutionary algorithm; or when the first determining result indicates that the number, of individuals in the population, that makes the optimization function monotonically increase or decrease is less than the monotonicity threshold, determining an optimal solution of the optimization function by using a multi-objective evolutionary algorithm; and determining a motion path of the mechanical arm according to the optimal solution.

Optionally, the optimization function is:

$$\begin{cases} \min\{F1 = |z_0 - l_1 + l_2 \times \cos\theta_2 - l_3 \times \cos(\theta_2 + \theta_3)|^2\} \\ \min\left\{F2 = \left|\sqrt{x_0^2 + y_0^2} - l_2 \times \sin\theta_2 + l_3 \times \sin(\theta_2 + \theta_3)\right|^2\right\} \end{cases};$$

where a coordinate point $(x_0, y_0, z_0)$ represents the theoretical coordinates of the tail end of the mechanical arm; $l_1$ is an arm length between a horizontal base joint O and a vertical joint A; $l_2$ is an arm length between the vertical joint A and a vertical joint B; $l_3$ is an arm length between the vertical joint B and an end effector; $\theta_2$ is a rotation angle value of a vertical joint shaft A; and $\theta_3$ is a rotation angle value of a vertical joint shaft B.

Optionally, the determining whether a number, of individuals in the population, that makes the optimization function monotonically increase or decrease is greater than or equal to a preset monotonicity threshold specifically includes:

determining a monotonic expression of the optimization function according to a directional derivative calculation formula;

determining, according to the monotonic expression and individuals in the evolutionary population, a number of individuals that makes the optimization function monotonically increase or decrease; and determining whether the number of individuals is greater than or equal to the monotonicity threshold.

Optionally, the determining an optimal solution of the optimization function by using a single-objective evolutionary algorithm specifically includes:

obtaining a crossover probability threshold and a mutation probability threshold;

calculating fitness of each individual in the evolutionary population;

updating the evolutionary population according to the fitness of each individual by using a binary tournament method;

randomly generating a corresponding crossover probability and mutation probability for each individual in the updated population;

conducting a crossover operation for an individual whose crossover probability is greater than the crossover probability threshold, and conducting a mutation operation for an individual whose mutation probability is greater than the mutation probability threshold, to generate a crossover mutant population; and using individuals, in the crossover mutant population, that result in a minimum linear sum of the lateral error optimization function and the longitudinal error optimization function, as the optimal solution.

Optionally, the determining an optimal solution of the optimization function by using a multi-objective evolutionary algorithm specifically includes:

obtaining an archive set size M and the $t^{th}$ generation archive set $Q_t$, where the archive set includes multiple individuals, and each individual is a group of arm joint rotation angles of the mechanical arm;

calculating fitness of each individual in the evolutionary population $P_t$ and the archive set $Q_t$;

selecting an individual whose fitness is less than 1, and storing the individual in the archive set, to obtain the updated archive set;

determining whether a number of individuals in the updated archive set is smaller than the archive set size, to obtain a second determining result;

when the second determining result indicates that the number of individuals in the updated archive set is smaller than the archive set size, successively filling corresponding individuals in the archive set in ascending order of fitness until the number of individuals in the archive set is equal to the archive set size; or when the second determining result indicates that the number of individuals in the updated archive set is larger than the archive set size, successively deleting one of a pair of individuals in the archive set that are nearest to each other until the number of individuals in the archive set is equal to the archive set size;

updating the archive set by using a binary tournament method;

randomly generating a corresponding crossover probability and mutation probability for each individual in the updated archive set;

conducting a crossover operation for an individual whose crossover probability is greater than the crossover probability threshold, and conducting a mutation operation for an individual whose mutation probability is greater than the mutation probability threshold, to generate a crossover mutant population; and using individuals, in the crossover mutant population, that result in a minimum linear sum of the lateral error optimization function and the longitudinal error optimization function, as the optimal solution.

A system for determining a motion path of a mechanical arm includes:

a mechanical arm parameter obtaining module, configured to obtain theoretical coordinates of a tail end of a mechanical arm, an arm length of the mechanical arm, and a base joint rotation angle of the mechanical arm;

a kinematics model establishment module, configured to establish a kinematics model of the mechanical arm according to the base joint rotation angle;

an optimization function construction module, configured to construct an optimization function according to the kinematic model, the theoretical coordinates of the tail end, and the arm length, where the optimization function includes a lateral error optimization function with an optimization objective of minimizing a length error of a transverse projection of the mechanical arm and a longitudinal error optimization function with an optimization objective of minimizing a length error of a vertical projection of the mechanical arm;

an evolutionary population obtaining module, configured to obtain the $t^{th}$ generation evolutionary population $P_t$, where the population includes multiple individuals, each individual is a group of arm joint rotation angles of the mechanical arm, and $0 < t \leq T$, where T represents an evolution algebra threshold;

a first determining module, configured to determine whether a number, of individuals in the population, that makes the optimization function monotonically increase or decrease is greater than or equal to a preset monotonicity threshold, to obtain a first determining result;

a single-objective evolution processing module, configured to: when the first determining result indicates that the number, of individuals in the population, that makes the optimization function monotonically increase or decrease is greater than or equal to the monotonicity threshold, determine an optimal solution of the optimization function by using a single-objective evolutionary algorithm; or a multi-objective evolution processing module, configured to: when the first determining result indicates that the number, of individuals in the population, that makes the optimization function monotonically increase or decrease is less than or equal to the monotonicity threshold, determine an optimal solution of the optimization function by using a multi-objective evolutionary algorithm; and a motion path determining module, configured to determine a motion path of the mechanical arm according to the optimal solution.

Optionally, the first determining module includes:

a monotonic expression determining unit, configured to determine a monotonic expression of the optimization function according to a directional derivative calculation formula;

a monotonic-individual-number determining unit, configured to determine, according to the monotonic expression and individuals in the evolutionary population, a number of individuals that makes the optimization function monotonically increase or decrease; and a first determining unit, configured to determine whether the number of individuals is greater than or equal to the monotonicity threshold.

Optionally, the single-objective evolution processing module includes:

a probability threshold obtaining unit, configured to obtain a crossover probability threshold and a mutation probability threshold;

a single-objective fitness calculation unit, configured to calculate fitness of each individual in the evolutionary population;

a binary tournament update unit, configured to update the evolutionary population according to the fitness of each individual by using a binary tournament method;

a crossover and mutation probability generation unit, configured to randomly generate a corresponding crossover probability and mutation probability for each individual in the updated population;

a crossover and mutation operation unit, configured to conduct a crossover operation for an individual whose crossover probability is greater than the crossover probability threshold, and conduct a mutation operation for an individual whose mutation probability is greater than the mutation probability threshold, to generate a crossover mutant population; and an optimal-solution determining unit, configured to use individuals, in the crossover mutant population, that result in a minimum linear sum of the lateral error optimization function and the longitudinal error optimization function, as the optimal solution.

Optionally, the multi-objective evolution processing module includes:

an archive set obtaining unit, configured to obtain an archive set size M and the $t^{th}$ generation archive set $Q_t$, where the archive set includes multiple individuals, and each individual is a group of arm joint rotation angles of the mechanical arm;

a multi-objective fitness calculation unit, configured to calculate fitness of each individual in the evolutionary population $P_t$ and the archive set $Q_t$;

an archive set update unit, configured to select an individual whose fitness is less than 1, and store the individual in the archive set, to obtain the updated archive set;

a second determining unit, configured to determine whether a number of individuals in the updated archive set is smaller than the archive set size, to obtain a second determining result;

an archive set filling unit, configured to: when the second determining result indicates that the number of individuals in the updated archive set is smaller than the archive set size, successively fill corresponding individuals in the archive set in ascending order of fitness until the number of individuals in the archive set is equal to the archive set size;

an archive-set individual deletion unit, configured to: when the second determining result indicates that the number of individuals in the updated archive set is larger than the archive set size, successively delete one of a pair of individuals in the archive set that are nearest to each other until the number of individuals in the archive set is equal to the archive set size;

a binary tournament update unit, configured to update the archive set by using a binary tournament method;

a crossover and mutation probability generation unit, configured to randomly generate a corresponding crossover probability and mutation probability for each individual in the updated population;

a crossover and mutation operation unit, configured to conduct a crossover operation for an individual whose crossover probability is greater than the crossover probability threshold, and conduct a mutation operation for an individual whose mutation probability is greater than the mutation probability threshold, to generate a crossover mutant population; and an optimal-solution determining unit, configured to use individuals, in the crossover mutant population, that result in a minimum linear sum of the lateral error optimization function and the longitudinal error optimization function, as the optimal solution.

According to specific embodiments provided in the present invention, the present invention discloses the following technical effects:

According to the method and system for a motion path of a mechanical arm that are provided in the present invention, after a kinematics model of a mechanical arm is established, multiple objective optimization function are constructed according to the kinematic model, theoretical coordinates of a tail end of the mechanical arm, and an arm length of the mechanical arm. Then, it is determined whether a number, of individuals in an evolutionary population, that makes both a lateral error optimization function and a longitudinal error optimization function in an optimization function monotonically increase or decrease reaches a preset monotonicity threshold; if the number, of individuals in the population, that makes both the lateral error optimization function and the longitudinal error optimization function in the optimization function monotonically increase or decrease reaches the monotonicity threshold, an optimal solution of the optimization function is determined by using a single-objective evolutionary algorithm; if the number, of individuals in the population, that makes both the lateral error optimization function and the longitudinal error optimization function in the optimization function monotonically increase or decrease is less than the monotonicity threshold, an optimal solution of the optimization function is determined by using a multi-objective evolutionary algorithm. According to the present invention, the multi-objective evolutionary algorithm or the single-objective evolutionary algorithm can be adaptively selected according to the number, of individuals in the population, that makes both the lateral error optimization function and the longitudinal error optimization function in the optimization function monotonically increase or decrease. Therefore, in the present invention, an advantage of short time consumption of the single-objective evolutionary algorithm and an advantage of high accuracy of the multi-objective evolutionary algorithm are combined, so that a motion path of the mechanical arm can be quickly and accurately planned.

BRIEF DESCRIPTION OF THE DRAWINGS

To describe the technical solutions in the embodiments of the present invention or in the prior art more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

The following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

An object of the present invention is to provide a method and system for a motion path of a mechanical arm, so as to quickly and accurately plan a motion path of a mechanical arm.

To make the objectives, features, and advantages of the present invention more obvious and easy to understand, the following further describes the present invention in details with reference to the accompanying drawings and specific implementations.

Figure 1:
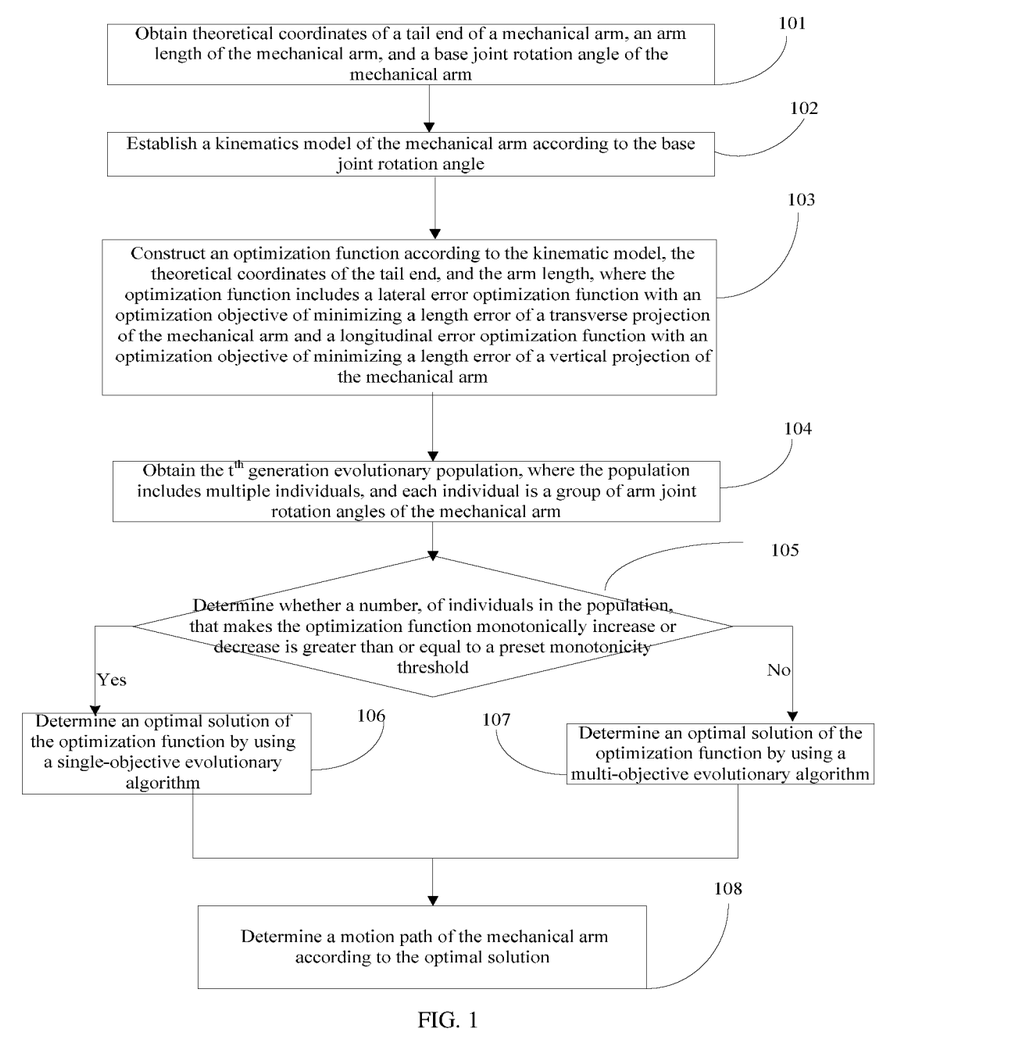
FIG. 1 is a flowchart of a method for determining a motion path of a mechanical arm according to an embodiment of the present invention.

FIG. 1 is a flowchart of a method for determining a motion path of a mechanical arm according to an embodiment of the present invention. As shown in FIG. 1, the method for determining a motion path of a mechanical arm is provided. The method includes:

Step 101: Obtain theoretical coordinates of a tail end of a mechanical arm, an arm length of the mechanical arm, and a base joint rotation angle of the mechanical arm.

Step 102: Establish a kinematics model of the mechanical arm according to the base joint rotation angle.

Step 103: Construct an optimization function according to the kinematic model, the theoretical coordinates of the tail end, and the arm length, where the optimization function includes a lateral error optimization function with an optimization objective of minimizing a length error of a transverse projection of the mechanical arm and a longitudinal error optimization function with an optimization objective of minimizing a length error of a vertical projection of the mechanical arm.

The optimization function is:

$$\begin{cases} \min\{F1 = |z_0 - l_1 + l_2 \times \cos\theta_2 - l_3 \times \cos(\theta_2 + \theta_3)|^2\} \\ \min\{F2 = \left|\sqrt{x_0^2 + y_0^2} - l_2 \times \sin\theta_2 + l_3 \times \sin(\theta_2 + \theta_3)\right|^2\} \end{cases}$$

where a coordinate point $(x_0, y_0, z_0)$ represents the theoretical coordinates of the tail end of the mechanical arm; $l_1$ is an arm length between a horizontal base joint O and a vertical joint A; $l_2$ is an arm length between the vertical joint A and a vertical joint B; $l_3$ is an arm length between the vertical joint B and an end effector; $\theta_2$ is a rotation angle value of a vertical joint shaft A; and $\theta_3$ is a rotation angle value of a vertical joint shaft B.

Step 104: Obtain the $t^{th}$ generation evolutionary population $P_t$, where the population includes multiple individuals, each individual is a group of arm joint rotation angles of the mechanical arm, and $0 < t \leq T$, where T represents an evolution algebra threshold.

Step 105: Determine whether a number, of individuals in the population, that makes the optimization function monotonically increase or decrease is greater than or equal to a preset monotonicity threshold, to obtain a first determining result.

Specifically, the determining whether a number, of individuals in the population, that makes the optimization function monotonically increase or decrease is greater than or equal to a preset monotonicity threshold specifically includes:

determining a monotonic expression of the optimization function according to a directional derivative calculation formula;

determining, according to the monotonic expression and individuals in the evolutionary population, a number of individuals that makes the optimization function monotonically increase or decrease; and determining whether the number of individuals is greater than or equal to the monotonicity threshold to obtain the first determining result.

Step 106: When the first determining result indicates that the number, of individuals in the population, that makes the optimization function monotonically increase or decrease is greater than or equal to the preset monotonicity threshold, determine an optimal solution of the optimization function by using a single-objective evolutionary algorithm.

Specifically, the determining an optimal solution of the optimization function by using a single-objective evolutionary algorithm specifically includes:

obtaining a crossover probability threshold and a mutation probability threshold;

calculating fitness of each individual in the evolutionary population;

updating the evolutionary population according to the fitness of each individual by using a binary tournament method;

randomly generating a corresponding crossover probability and mutation probability for each individual in the updated population;

conducting a crossover operation for an individual whose crossover probability is greater than the crossover probability threshold, and conducting a mutation operation for an individual whose mutation probability is greater than the mutation probability threshold, to generate a crossover mutant population; and using individuals, in the crossover mutant population, that result in a minimum linear sum of the lateral error optimization function and the longitudinal error optimization function, as the optimal solution.

Step 107: When the first determining result indicates that the number, of individuals in the population, that makes the optimization function monotonically increase or decrease is less than the monotonicity threshold, determine an optimal solution of the optimization function by using a multi-objective evolutionary algorithm.

Specifically, the determining an optimal solution of the optimization function by using a multi-objective evolutionary algorithm specifically includes:

obtaining an archive set size M and the tth generation archive set $Q_t$, where the archive set includes multiple individuals, and each individual is a group of arm joint rotation angles of the mechanical arm.

calculating fitness of each individual in the evolutionary population $P_t$ and the archive set $Q_t$;

selecting an individual whose fitness is less than 1, and storing the individual in the archive set, to obtain the updated archive set;

determining whether a number of individuals in the updated archive set is smaller than the archive set size, to obtain a second determining result;

when the second determining result indicates that the number of individuals in the updated archive set is smaller than the archive set size, successively filling corresponding individuals in the archive set in ascending order of fitness until the number of individuals in the archive set is equal to the archive set size;

when the second determining result indicates that the number of individuals in the updated archive set is larger than the archive set size, successively deleting one of a pair of individuals in the archive set that are nearest to each other until the number of individuals in the archive set is equal to the archive set size;

updating the archive set by using a binary tournament method;

randomly generating a corresponding crossover probability and mutation probability for each individual in the updated archive set;

conducting a crossover operation for an individual whose crossover probability is greater than the crossover probability threshold, and conducting a mutation operation for an individual whose mutation probability is greater than the mutation probability threshold, to generate a crossover mutant population; and using individuals, in the crossover mutant population, that result in a minimum linear sum of the lateral error optimization function and the longitudinal error optimization function, as the optimal solution.

Step 108: Determine a motion path of the mechanical arm according to the optimal solution.

Figure 2:
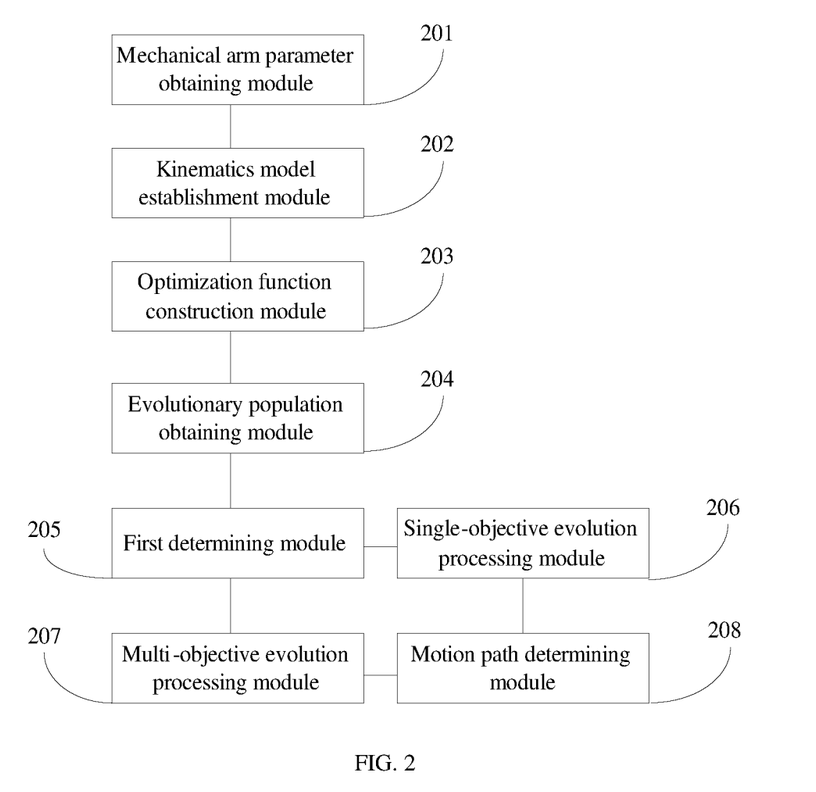
FIG. 2 is a structural block diagram of a system for determining a motion path of a mechanical arm according to an embodiment of the present invention.

FIG. 2 is a structural block diagram of a system for determining a motion path of a mechanical arm according to an embodiment of the present invention. As shown in FIG. 2, the system for determining a motion path of a mechanical arm is provided. The system includes a mechanical arm parameter obtaining module 201, a kinematics model establishment module 202, an optimization function construction module 203, an evolutionary population obtaining module 204, a first determining module 205, single-objective evolution processing module 206, a multi-objective evolution processing module 207, and a motion path determining module 208.

The mechanical arm parameter obtaining module 201 is configured to obtain theoretical coordinates of a tail end of a mechanical arm, an arm length of the mechanical arm, and a base joint rotation angle of the mechanical arm.

The kinematics model establishment module 202 is configured to establish a kinematics model of the mechanical arm according to the base joint rotation angle.

The optimization function construction module 203 is configured to construct an optimization function according to the kinematic model, the theoretical coordinates of the tail end, and the arm length, where the optimization function includes a lateral error optimization function with an optimization objective of minimizing a length error of a transverse projection of the mechanical arm and a longitudinal error optimization function with an optimization objective of minimizing a length error of a vertical projection of the mechanical arm.

The evolutionary population obtaining module 204, configured to obtain the $t^{th}$ generation evolutionary population $P_t$, where the population includes multiple individuals, each individual is a group of arm joint rotation angles of the mechanical arm, and $0<t\leq T$, where T represents an evolution algebra threshold.

The first determining module 205, configured to determine whether a number, of individuals in the population, that makes the optimization function monotonically increase or decrease is greater than or equal to a preset monotonicity threshold, to obtain a first determining result.

Specifically, the first determining module 205 includes:

a monotonic expression determining unit, configured to determine a monotonic expression of the optimization function according to a directional derivative calculation formula;

a monotonic-individual-number determining unit, configured to determine, according to the monotonic expression and individuals in the evolutionary population, a number of individuals that makes the optimization function monotonically increase or decrease; and a first determining unit, configured to determine whether the number of individuals is greater than or equal to the monotonicity threshold.

The single-objective evolution processing module 206 is configured to: when the first determining result indicates that the number, of individuals in the population, that makes the optimization function monotonically increase or decrease is greater than or equal to the monotonicity threshold, determine an optimal solution of the optimization function by using a single-objective evolutionary algorithm.

Specifically, the single-objective evolution processing module 206 includes:

a probability threshold obtaining unit, configured to obtain a crossover probability threshold and a mutation probability threshold;

a single-objective fitness calculation unit, configured to calculate fitness of each individual in the evolutionary population;

a binary tournament update unit, configured to update the evolutionary population according to the fitness of each individual by using a binary tournament method;

a crossover and mutation probability generation unit, configured to randomly generate a corresponding crossover probability and mutation probability for each individual in the updated population;

a crossover and mutation operation unit, configured to conduct a crossover operation for an individual whose crossover probability is greater than the crossover probability threshold, and conduct a mutation operation for an individual whose mutation probability is greater than the mutation probability threshold, to generate a crossover mutant population; and an optimal-solution determining unit, configured to use individuals, in the crossover mutant population, that result in a minimum linear sum of the lateral error optimization function and the longitudinal error optimization function, as the optimal solution.

The multi-objective evolution processing module 207 is configured to: when the first determining result indicates that the number, of individuals in the population, that makes the optimization function monotonically increase or decrease is less than or equal to the monotonicity threshold, determine an optimal solution of the optimization function by using a multi-objective evolutionary algorithm.

Specifically, the multi-objective evolution processing module 207 includes:

an archive set obtaining unit, configured to obtain an archive set size M and the tth generation archive set $Q_t$, where the archive set includes multiple individuals, and each individual is a group of arm joint rotation angles of the mechanical arm;

a multi-objective fitness calculation unit, configured to calculate fitness of each individual in the evolutionary population $P_t$ and the archive set $Q_t$;

an archive set update unit, configured to select an individual whose fitness is less than 1, and store the individual in the archive set, to obtain the updated archive set;

a second determining unit, configured to determine whether a number of individuals in the updated archive set is smaller than the archive set size, to obtain a second determining result;

an archive set filling unit, configured to: when the second determining result indicates that the number of individuals in the updated archive set is smaller than the archive set size, successively fill corresponding individuals in the archive set in ascending order of fitness until the number of individuals in the archive set is equal to the archive set size;

an archive-set individual deletion unit, configured to: when the second determining result indicates that the number of individuals in the updated archive set is larger than the archive set size, successively delete one of a pair of individuals in the archive set that are nearest to each other until the number of individuals in the archive set is equal to the archive set size;

a binary tournament update unit, configured to update the archive set by using a binary tournament method;

a crossover and mutation probability generation unit, configured to randomly generate a corresponding crossover probability and mutation probability for each individual in the updated population;

a crossover and mutation operation unit, configured to conduct a crossover operation for an individual whose crossover probability is greater than the crossover probability threshold, and conduct a mutation operation for an individual whose mutation probability is greater than the mutation probability threshold, to generate a crossover mutant population; and an optimal-solution determining unit, configured to use individuals, in the crossover mutant population, that result in a minimum linear sum of the lateral error optimization function and the longitudinal error optimization function, as the optimal solution.

The motion path determining module 208 is configured to determine a motion path of the mechanical arm according to the optimal solution.

The following describes a specific implementation process of the method for determining a motion path of a mechanical arm by using a mechanical arm including one rotatable base and two arm joint shafts as a study object.

1. Establish a kinematics model of the mechanical arm and conduct parameterization on a joint variable.

Figure 3:
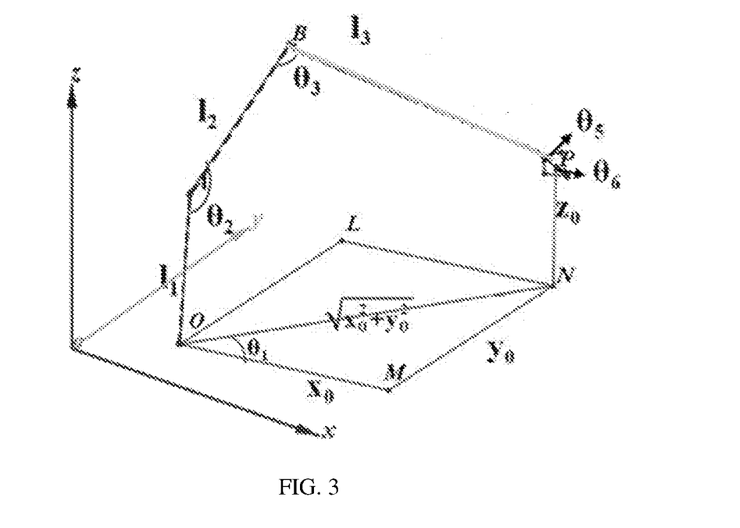
FIG. 3 is a kinematics model diagram of a mechanical arm according to an embodiment of the present invention.

In this embodiment, the mechanical arm includes one rotatable base and two joint shafts, and therefore each joint can freely rotate within a range. An actual mechanical arm is located in three-dimensional space, and the description of a motion process is relatively complex. Therefore, converting the three-dimensional space into a two-dimensional plane for study is considered. A mechanical arm kinematics model shown in FIG. 3 is established based on three-dimensional coordinates of an tail end of the mechanical arm, where O represents a base, A and B represent joint shafts, $l_1$, $l_2$, and $l_3$ respectively represent arm lengths of three arms, a coordinate point $(x_0, y_0, z_0)$ represents theoretical coordinates of the tail end of the mechanical arm, a coordinate point $(x, y, z)$ represents actual coordinates of the tail end of the mechanical arm, a point N represents a subpoint of the tail end of the mechanical arm on a vertical plane, and to-be-resolved optimal joint rotation angles are a rotation angle $\theta_2$ of the joint shaft A and a rotation angle $\theta_3$ of the joint shaft B. For an actual target position, a joint rotation angle of the base of the mechanical arm is determinate. Therefore, as long as the joint rotation angle of the base of the mechanical arm is calculated in space first, the joint rotation angle is fixed, and only remaining joint rotation angles need to be studied.

2. Construct an optimization function, where minimizing a length error of a transverse projection and minimizing a length error of a vertical projection for the mechanical arm in the three-dimensional space are used as optimization objectives, and path planning of the mechanical arm is transformed into finding an equilibrium solution of two objective functions.

An optimization function including multiple objectives, that is, multivariate function relations between the theoretical coordinates of the tail end of the mechanical arm, and an arm length of the mechanical arm and a joint rotation angle combination, is calculated according to a relationship between a length of the transverse projection and a length of the vertical projection of the mechanical arm, where the theoretical coordinates of the tail end of the mechanical arm and the arm length of the mechanical arm are known data. In order to make the coordinates $(x, y, z)$ of the tail end of the mechanical arm close as possible to a root position of a target point, that is, the theoretical coordinates $(x_0, y_0, z_0)$ of the tail end, as long as $\sqrt{x^2+y^2}$ approaches $\sqrt{x_0^2+y_0^2}$, and z approaches $z_0$, a group of joint rotation angle values is obtained. On this basis, the following optimal path model with a minimum coordinate error sum of squares is established, that is, the objective function needs to be optimized. The optimization function in this embodiment is:

$$\begin{cases} \min\{F1 = |z_0 - l_1 + l_2 \times \cos\theta_2 - l_3 \times \cos(\theta_2 + \theta_3)|^2\} \\ \min\left\{F2 = \left|\sqrt{x_0^2 + y_0^2} - l_2 \times \sin\theta_2 + l_3 \times \sin(\theta_2 + \theta_3)\right|^2\right\} \end{cases};$$

where a coordinate point $(x_0, y_0, z_0)$ represents the theoretical coordinates of the tail end of the mechanical arm; $l_1$ is an arm length between the horizontal base joint O and a vertical joint A; $l_2$ is an arm length between the vertical joint A and a vertical joint B; $l_3$ is an arm length between the vertical joint B and an end effector; $\theta_2$ is a rotation angle value of the vertical joint shaft A; and $\theta_3$ is a rotation angle value of the vertical joint shaft B.

Multi-objective functions, that is, the multivariate function relations between the theoretical coordinates of the tail end of the mechanical arm, and the arm length of the mechanical arm and the joint rotation angle, are calculated according to the relationship between the length of the transverse projection and the length of the vertical projection of the mechanical arm, and an optimization solution process of an optimal joint rotation angle combination is conducted to obtain a Pareto non-dominated solution set; and a solution is selected from the obtained Pareto non-dominated solution set according to a principle of minimizing a linear sum of the two objective functions, where a joint rotation angle combination included in the solution can minimize the length of the transverse projection and the length of the vertical projection of the mechanical arm.

The Pareto non-dominated solution set is defined as: For all objectives, in any two solutions S1 and S2, if S1 is superior to S2, S1 dominates S2; if the solution S1 is not dominated by other solutions, S1 is referred to as a non-dominant solution.

Figure 4:
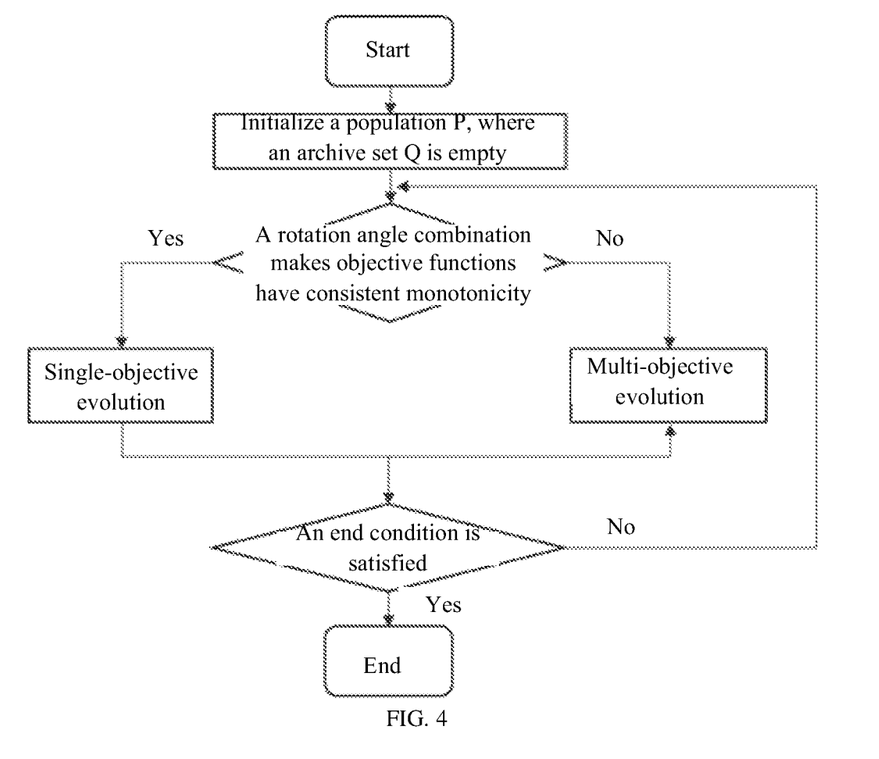
FIG. 4 is a flowchart of a variable objective evolutionary algorithm according to an embodiment of the present invention.

3. Perform specific optimization steps by using a variable objective evolutionary algorithm, as shown in FIG. 4:

Step 1: Initialize parameters including a population size N (which is an integer greater than 0), an archive set size M (which is an integer greater than 0), an evolutionary algebra counter t, an initial population $P_0$, and an initial archive set $Q_0$, and generate an initial population through random assignment, where chromosome individuals in the population are a random joint rotation value combination.

Step 2: Determine whether a specified number of iterations is reached; and if no, continue to execute iteration; if yes, output an equilibrium solution of a multi-objective function, that is, an optimal joint rotation value combination.

Step 3: Conduct monotonicity calculation, and calculate, by using a directional derivative formula, individuals of a $P_t$ population that make the objective functions monotonically increase or decrease.

An optimization function is a function of two variables, and a joint rotation value combination that makes the optimization function monotonically increase or decrease can be solved according to a directional derivative formula $$\frac{\partial f}{\partial l} = \frac{\partial f}{\partial x}\cos\varphi + \frac{\partial f}{\partial y}\sin\varphi.$$

If a value of the formula is negative, the optimization function monotonically decreases; otherwise, the optimization function monotonically increases. When a joint rotation angle combination makes all directional derivatives of multi-objective function at a point along a direction 1 are negative or positive, monotonicity of the multi-objective function is consistent, that is, the functions do not conflict with each other; otherwise, monotonicity of the multi-objective function is inconsistent, that is, the functions conflict with each other.

Assuming that both an included angle between the direction 1 and an x-axis and an included angle between the direction 1 and a y-axis are φ, that is, direction angles are φ. In this embodiment, let $$\varphi = 45°, m = z_0 - l_1 + l_2 \times \cos\theta_2 - l_3 \times \cos(\theta_2 + \theta_3), \text{ and}$$

$$n = \sqrt{x_0^2 + y_0^2} - l_2 \times \sin\theta_2 + l_3 \times \sin(\theta_2 + \theta_3),$$

$$\frac{\partial F1}{\partial \theta_2} = 2 \times m \times (-l_2 \times \sin\theta_2) + l_3 \times \sin(\theta_2 + \theta_3);$$

$$\frac{\partial F1}{\partial \theta_3} = 2 \times m \times l_3 \times \sin(\theta_2 + \theta_3);$$

$$\frac{\partial F2}{\partial \theta_2} = 2 \times n \times (-l_2 \times \cos\theta_2) + l_3 \times \cos(\theta_2 + \theta_3);$$

$$\frac{\partial F2}{\partial \theta_3} = 2 \times n \times l_3 \times \sin(\theta_2 + \theta_3);$$

$$\frac{\partial F1}{\partial l} = \frac{\partial F1}{\partial \theta_2} \times \frac{\sqrt{2}}{2} + \frac{\partial F1}{\partial \theta_3} \times \frac{\sqrt{2}}{2};$$

$$\frac{\partial F2}{\partial l} = \frac{\partial F2}{\partial \theta_2} \times \frac{\sqrt{2}}{2} + \frac{\partial F2}{\partial \theta_3} \times \frac{\sqrt{2}}{2}.$$

Step 4: Conduct adaptive selection; determine whether there are more than a specific proportion of individuals in the evolutionary population Pt that make the multi-objective optimization function have consistent monotonicity; and if yes, the problem can be simplified to searching for an optimal solution of a linear sum of values of the multi-objective function, that is, a single-objective evolutionary operation on the population, and go to step 5; otherwise, continue to search for an optimal solution that equalizes the values of the multi-objective function, that is, a multi-objective SPEA2 operation on Pt, and go to step 6.

Step 5: Conduct a single-objective evolutionary algorithm.

(1) Calculate fitness of each individual in the evolutionary population.

Fitness of each individual is calculated according to a formula $$P(i) = \frac{F(i)}{\sum_{j=1}^{n} F(i)},$$

where F(i) represents a fitness function of an $i^{th}$ individual, n represents a number of individuals in the evolutionary population, and P(i) represents fitness of the $i^{th}$ individual.

(2) Conduct binary tournament selection: randomly select two individuals in the population $P_t$, save an individual with larger fitness to a next generation, and repeatedly conduct the process until a number of individuals in the next generation reaches the preset population size N.

(3) Conduct crossover: randomly generate a crossover probability threshold for each individual in the population, and when a crossover probability of an individual exceeds a crossover probability threshold preset by a system, the individual is marked as a crossable individual. For two crossable individuals A and B, a crossover degree probability $P_a$ is generated randomly, so that individuals after crossover is $$A' = A \times P_a + B \times (1-P_a), B' = B \times P_a + A \times (1-P_a).$$

(4) Conduct mutation: randomly generate a mutation probability for each individual in the population, and when a mutation probability of an individual exceeds a mutation probability threshold preset by the system, the individual is marked as a mutable individual A. For the mutable individual A, a mutation degree probability $P_b$ is generated randomly, and the value of the individual increases or decreases due to random generation. A mutated individual A" is:

$$A'' = A - P_b \times (A - \text{lower}\_A) \text{ or } A'' = A + P_b \times \text{upper}\_A;$$

where upper_A represents an upper limit of the value of the individual A, lower_A represents a lower limit of the value of the individual A, and A" represents a mutated individual.

Step 6: Conduct a multi-objective evolutionary algorithm.

(1) Calculate fitness of each individual in a population $P_t$ and an archive set $Q_t$.

A calculation method of individual fitness in SPEA2 is as follows:

$$F(i) = R(i) + D(i),$$

$$R(i) = \sum_{j \in P+Q, j>1} S(j),$$

$$S(j) = |\{j \mid j \in P + Q \cap i > j\}|,$$

$$D(i) = \frac{1}{\sigma_i^k + 2}, \text{ and } k = \sqrt{|P| + |Q|}.$$

R(i) and D(i) represent two factors that affect fitness F(i) of an individual i, and R(i) and S(i) can be calculated according to a Pareto dominant conception; $\sigma_i^k$ is a distance between the individual i and a $k^{th}$ neighboring individual, and distances between the individual i and all other individuals in the evolutionary population P and the archive set Q need to be calculated, and are ranked according to an ascending order; and addition of D(i) reflects a correlation between different targets, P represents a number of individuals in the evolutionary population $P_t$, and Q represents a number of individuals in the archive set $Q_t$.

(2) Conduct environment selection on the population $P_t$ and the archive set $Q_t$, to generate an archive set $Q_{t+1}$, where t represents an evolutionary algebra. First, an individual whose fitness is less than 1 is selected and stored in the archive set $Q_{t+1}$, that is, $$Q_{t+1} = \{i \mid i \in P_t + Q_t \cap F(i) < 1\}.$$

If a number of individuals in the archive set $Q_{t+1}$ is less than a predetermined archive set size M, a filling operation is required. To be specific, sorting based on individual fitness is conducted on a new populations obtained by combining the population $P_t$ and the archive set $Q_t$, and an individual with least fitness is preferentially selected and stored in the archive set $Q_{t+1}$ until the number of individuals in the archive set is equal to the preset value M.

If a number of individuals in the archive set $Q_{t+1}$ is greater than the predetermined archive set size M, a deletion operation is required. To be specific, one of closest individuals in the population is deleted successively until the number of individuals in the archive set $Q_{t+1}$ is equal to the preset value M.

(3) Conduct binary tournament selection, a crossover operation, and a mutation operation on the archive set $Q_{t+1}$ to generate a population $P_{t+1}$, where the selection, crossover, mutation operations are the same as selection, crossover, and mutation in a simple genetic algorithm in the single-objective evolutionary algorithm in step 5, and details are not repeated herein.

Step 7. Return to conduct step 3.

In the present invention, monotonicity study is conducted on multivariate functions based on a directional derivative, a single-objective evolutionary algorithm or a multi-objective evolutionary algorithm is adaptively selected; after thorough analysis and comparison, a variable objective evolutionary algorithm is obtained; and an advantage of short time consumption of the single-objective evolutionary algorithm and an advantage of high accuracy of the multi-objective evolutionary algorithm are combined.

50-generation adaptive selection obtained in one test by using an algorithm is shown in Table 1, where in an algorithm selection table, 1 indicates that multi-objective SPEA2 is selected, and 0 indicates that a single-objective simple genetic algorithm is selected. Joint rotation angle value parameters obtained by an example test conducted 50 times by using an algorithm are shown in Table 2.

TABLE 1

50-generation population adaptive algorithm selection table

| Evolution algebra | Number of non-conflict individuals | Number of conflicted individuals | Algorithm selection |
|---|---|---|---|
| 1 | 102 | 98 | 1 |
| 2 | 85 | 115 | 1 |
| 3 | 91 | 109 | 1 |
| 4 | 84 | 116 | 1 |
| 5 | 63 | 137 | 1 |
| 6 | 59 | 141 | 1 |
| 7 | 74 | 126 | 1 |
| 8 | 85 | 115 | 1 |
| 9 | 76 | 124 | 1 |
| 10 | 97 | 103 | 1 |
| 11 | 104 | 96 | 1 |
| 12 | 106 | 94 | 1 |
| 13 | 139 | 61 | 1 |
| 14 | 150 | 50 | 0 |
| 15 | 139 | 61 | 1 |
| 16 | 133 | 67 | 1 |
| 17 | 141 | 59 | 0 |
| 18 | 145 | 55 | 0 |
| 19 | 147 | 53 | 0 |
| 20 | 152 | 48 | 0 |
| 21 | 144 | 56 | 0 |
| 22 | 143 | 57 | 0 |
| 23 | 133 | 67 | 1 |
| 24 | 145 | 55 | 0 |
| 25 | 133 | 67 | 1 |
| 26 | 133 | 67 | 1 |
| 27 | 132 | 68 | 1 |
| 28 | 123 | 77 | 1 |
| 29 | 112 | 88 | 1 |
| 30 | 125 | 75 | 1 |
| 31 | 108 | 92 | 1 |
| 32 | 122 | 78 | 1 |
| 33 | 124 | 76 | 1 |
| 34 | 122 | 78 | 1 |
| 35 | 138 | 62 | 1 |
| 36 | 152 | 48 | 0 |
| 37 | 163 | 37 | 0 |
| 38 | 171 | 29 | 0 |
| 39 | 177 | 23 | 0 |
| 40 | 182 | 18 | 0 |
| 41 | 195 | 5 | 0 |
| 42 | 193 | 7 | 0 |
| 43 | 192 | 8 | 0 |
| 44 | 193 | 7 | 0 |
| 45 | 195 | 5 | 0 |
| 46 | 193 | 7 | 0 |
| 47 | 197 | 3 | 0 |
| 48 | 195 | 5 | 0 |
| 49 | 195 | 5 | 0 |
| 50 | 197 | 3 | 0 |

TABLE 2

Table of joint rotation angle value parameter obtained by an example test conducted 50 times by using an algorithm

| Target point (x, y, z) | $\theta_1$/rad | $\theta_2$/rad | $\theta_3$/rad | Average error (mm) |
|---|---|---|---|---|
| (0.850, 350) | 1.571 | 2.326 | 1.929 | 0.02 |

In the variable objective evolutionary algorithm provided in the present invention, whether multiple objectives conflict with each other is determined based on a directional derivative, and if yes, a multi-objective evolutionary algorithm is selected to search for an equilibrium solution, and if no, a single-objective evolutionary algorithm is selected for rapid convergence. A processing scheme is automatically adjusted according to a data feature of processed data, and different operation algorithms are adaptively selected to keep getting closer to the objectives, so that a motion path of a mechanical arm can be quickly and accurately planned, and therefore the present invention has a good application prospect.

Each embodiment of the present specification is described in a progressive manner, each embodiment focuses on the difference from other embodiments, and the same and similar parts between the embodiments may refer to each other. For a system disclosed in the embodiments, since it corresponds to the method disclosed in the embodiments, the description is relatively simple, and reference can be made to the method description.

Several examples are used for illustration of the principles and implementation methods of the present invention. The description of the embodiments is used to help illustrate the method and its core principles of the present invention. In addition, those skilled in the art can make various modifications in terms of specific embodiments and scope of application in accordance with the teachings of the present invention. In conclusion, the content of this specification shall not be construed as a limitation to the invention.

What is claimed is:

1. A method for determining a motion path of a mechanical arm, wherein the method comprises:
    obtaining theoretical coordinates of a tail end of a mechanical arm, an arm length of the mechanical arm, and a joint rotation angle of the mechanical arm;

establishing a kinematics model of the mechanical arm according to the joint rotation angle;

constructing an optimization function according to the kinematic model, the theoretical coordinates of the tail end, and the arm length, wherein the optimization function comprises a lateral error optimization function with an optimization objective of minimizing a length error of a transverse projection of the mechanical arm and a longitudinal error optimization function with an optimization objective of minimizing a length error of a vertical projection of the mechanical arm;

obtaining the $t^{th}$ generation evolutionary population $P_t$, wherein the population comprises multiple individuals, each individual is a group of joint rotation angles of the mechanical arm, and $0 < t \leq T$, wherein T represents an evolution algebra threshold;

determining whether a number, of individuals in the population, that makes the optimization function monotonically increase or decrease is greater than or equal to a preset monotonicity threshold, to obtain a first determining result;

when the first determining result indicates that the number, of individuals in the population, that makes the optimization function monotonically increase or decrease is greater than or equal to the preset monotonicity threshold, determining an optimal solution of the optimization function by using a single-objective evolutionary algorithm; or when the first determining result indicates that the number, of individuals in the population, that makes the optimization function monotonically increase or decrease is less than the monotonicity threshold, determining an optimal solution of the optimization function by using a multi-objective evolutionary algorithm; and determining a motion path of the mechanical arm according to the optimal solution.

2. The method according to claim 1, the optimization function is:

$$\begin{cases} \min\{F1 = |z_0 - l_1 + l_2 \times \cos\theta_2 - l_3 \times \cos(\theta_2 + \theta_3)|^2\} \\ \min\{F2 = \left|\sqrt{x_0^2 + y_0^2} - l_2 \times \sin\theta_2 + l_3 \times \sin(\theta_2 + \theta_3)\right|^2\} \end{cases};$$

wherein a coordinate point $(x_0, y_0, z_0)$ represents the theoretical coordinates of the tail end of the mechanical arm; $l_1$ is an arm length between a horizontal base joint O and a vertical joint A; $l_2$ is an arm length between the vertical joint A and a vertical joint B; $l_3$ is an arm length between the vertical joint B and an end effector; $\theta_2$ is a joint rotation angle of the vertical joint A; and $\theta_3$ is a joint rotation angle of the vertical joint B.

3. The method according to claim 1, the determining whether a number, of individuals in the population, that makes the optimization function monotonically increase or decrease is greater than or equal to a preset monotonicity threshold specifically comprises:

determining a monotonic expression of the optimization function according to a directional derivative calculation formula;

determining, according to the monotonic expression and individuals in the evolutionary population, a number of individuals that makes the optimization function monotonically increase or decrease; and determining whether the number of individuals is greater than or equal to the monotonicity threshold.

4. The method according to claim 1, the determining an optimal solution of the optimization function by using a single-objective evolutionary algorithm specifically comprises:

obtaining a crossover probability threshold and a mutation probability threshold;

calculating fitness of each individual in the evolutionary population;

updating the evolutionary population according to the fitness of each individual by using a binary tournament method;

randomly generating a corresponding crossover probability and mutation probability for each individual in the updated population;

conducting a crossover operation for an individual whose crossover probability is greater than the crossover probability threshold, and conducting a mutation operation for an individual whose mutation probability is greater than the mutation probability threshold, to generate a crossover mutant population; and using individuals, in the crossover mutant population, that result in a minimum linear sum of the lateral error optimization function and the longitudinal error optimization function, as the optimal solution.

5. The method according to claim 1, the determining an optimal solution of the optimization function by using a multi-objective evolutionary algorithm specifically comprises:

obtaining an archive set size M and the $t^{th}$ generation archive set $Q_t$, wherein the archive set comprises multiple individuals, and each individual is a group of joint rotation angles of the mechanical arm;

calculating fitness of each individual in the evolutionary population $P_t$ and the archive set $Q_t$;

selecting an individual whose fitness is less than 1, and storing the individual in the archive set, to obtain the updated archive set;

determining whether a number of individuals in the updated archive set is smaller than the archive set size, to obtain a second determining result;

when the second determining result indicates that the number of individuals in the updated archive set is smaller than the archive set size, successively filling corresponding individuals in the archive set in ascending order of fitness until the number of individuals in the archive set is equal to the archive set size; or when the second determining result indicates that the number of individuals in the updated archive set is larger than the archive set size, successively deleting one of a pair of individuals in the archive set that are nearest to each other until the number of individuals in the archive set is equal to the archive set size;

updating the archive set by using a binary tournament method;

randomly generating a corresponding crossover probability and mutation probability for each individual in the updated archive set;

conducting a crossover operation for an individual whose crossover probability is greater than a crossover probability threshold, and conducting a mutation operation for an individual whose mutation probability is greater than a mutation probability threshold, to generate a crossover mutant population; and using individuals, in the crossover mutant population, that result in a minimum linear sum of the lateral error optimization function and the longitudinal error optimization function, as the optimal solution.

6. A system for determining a motion path of a mechanical arm, wherein the system comprises:
- a mechanical arm parameter obtaining module, configured to obtain theoretical coordinates of a tail end of a mechanical arm, an arm length of the mechanical arm, and a joint rotation angle of the mechanical arm;
- a kinematics model establishment module, configured to establish a kinematics model of the mechanical arm according to the joint rotation angle;
- an optimization function construction module, configured to construct an optimization function according to the kinematic model, the theoretical coordinates of the tail end, and the arm length, wherein the optimization function comprises a lateral error optimization function with an optimization objective of minimizing a length error of a transverse projection of the mechanical arm and a longitudinal error optimization function with an optimization objective of minimizing a length error of a vertical projection of the mechanical arm;
- an evolutionary population obtaining module, configured to obtain the $t^{th}$ generation evolutionary population $P_t$, wherein the population comprises multiple individuals, each individual is a group of joint rotation angles of the mechanical arm, and $0<t\leq T$, wherein T represents an evolution algebra threshold;
- a first determining module, configured to determine whether a number, of individuals in the population, that makes the optimization function monotonically increase or decrease is greater than or equal to a preset monotonicity threshold, to obtain a first determining result;
- a single-objective evolution processing module, configured to: when the first determining result indicates that the number, of individuals in the population, that makes the optimization function monotonically increase or decrease is greater than or equal to the monotonicity threshold, determine an optimal solution of the optimization function by using a single-objective evolutionary algorithm; or
- a multi-objective evolution processing module, configured to: when the first determining result indicates that the number, of individuals in the population, that makes the optimization function monotonically increase or decrease is less than or equal to the monotonicity threshold, determine an optimal solution of the optimization function by using a multi-objective evolutionary algorithm; and
- a motion path determining module, configured to determine a motion path of the mechanical arm according to the optimal solution.

7. The system according to claim 6, wherein the first determining module comprises:
- a monotonic expression determining unit, configured to determine a monotonic expression of the optimization function according to a directional derivative calculation formula;
- a monotonic-individual-number determining unit, configured to determine, according to the monotonic expression and individuals in the evolutionary population, a number of individuals that makes the optimization function monotonically increase or decrease; and
- a first determining unit, configured to determine whether the number of individuals is greater than or equal to the monotonicity threshold.

8. The system according to claim 6, wherein the single-objective evolution processing module comprises:
- a probability threshold obtaining unit, configured to obtain a crossover probability threshold and a mutation probability threshold;
- a single-objective fitness calculation unit, configured to calculate fitness of each individual in the evolutionary population;
- a binary tournament update unit, configured to update the evolutionary population according to the fitness of each individual by using a binary tournament method;
- a crossover and mutation probability generation unit, configured to randomly generate a corresponding crossover probability and mutation probability for each individual in the updated population;
- a crossover and mutation operation unit, configured to conduct a crossover operation for an individual whose crossover probability is greater than the crossover probability threshold, and conduct a mutation operation for an individual whose mutation probability is greater than the mutation probability threshold, to generate a crossover mutant population; and
- an optimal-solution determining unit, configured to use individuals, in the crossover mutant population, that result in a minimum linear sum of the lateral error optimization function and the longitudinal error optimization function, as the optimal solution.

9. The system according to claim 6, wherein the multi-objective evolution processing module comprises:
- an archive set obtaining unit, configured to obtain an archive set size M and the $t^{th}$ generation archive set $Q_t$, wherein the archive set comprises multiple individuals, and each individual is a group of joint rotation angles of the mechanical arm;
- a multi-objective fitness calculation unit, configured to calculate fitness of each individual in the evolutionary population $P_t$ and the archive set $Q_t$;
- an archive set update unit, configured to select an individual whose fitness is less than 1, and store the individual in the archive set, to obtain the updated archive set;
- a second determining unit, configured to determine whether a number of individuals in the updated archive set is smaller than the archive set size, to obtain a second determining result;
- an archive set filling unit, configured to: when the second determining result indicates that the number of individuals in the updated archive set is smaller than the archive set size, successively fill corresponding individuals in the archive set in ascending order of fitness until the number of individuals in the archive set is equal to the archive set size;
- an archive-set individual deletion unit, configured to: when the second determining result indicates that the number of individuals in the updated archive set is larger than the archive set size, successively delete one of a pair of individuals in the archive set that are nearest to each other until the number of individuals in the archive set is equal to the archive set size;
- a binary tournament update unit, configured to update the archive set by using a binary tournament method;
- a crossover and mutation probability generation unit, configured to randomly generate a corresponding crossover probability and mutation probability for each individual in the updated population;
- a crossover and mutation operation unit, configured to conduct a crossover operation for an individual whose crossover probability is greater than the crossover probability threshold, and conduct a mutation operation for an individual whose mutation probability is greater than a mutation probability threshold, to generate a crossover mutant population; and an optimal-solution determining unit, configured to use individuals, in the crossover mutant population, that result in a minimum linear sum of the lateral error optimization function and the longitudinal error optimization function, as the optimal solution.

\* \* \* \* \*